Jan. 15, 1957 V. I. DUDLEY 2,777,526
LOW HEIGHT MINE HAULAGE VEHICLE
Original Filed Oct. 27, 1950 2 Sheets-Sheet 1
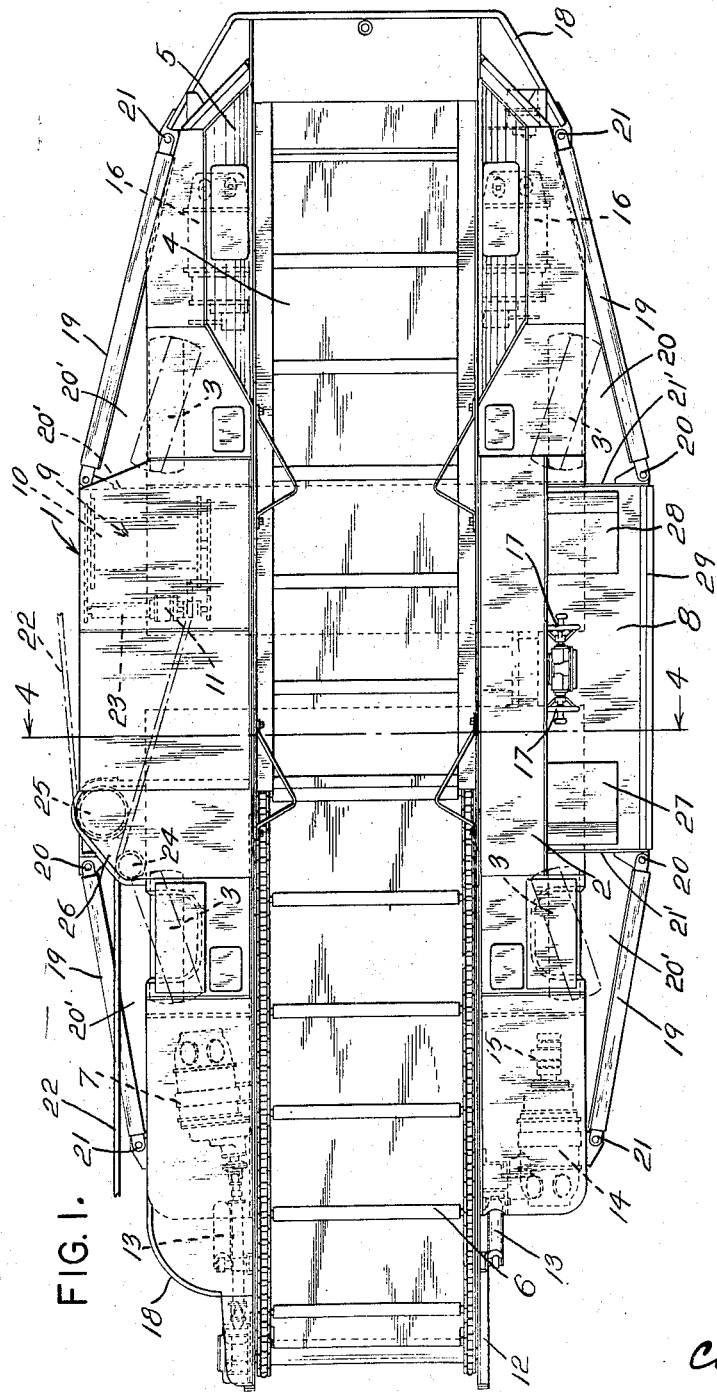
INVENTOR:
VICTOR I. DUDLEY.
BY
ATTORNEY.

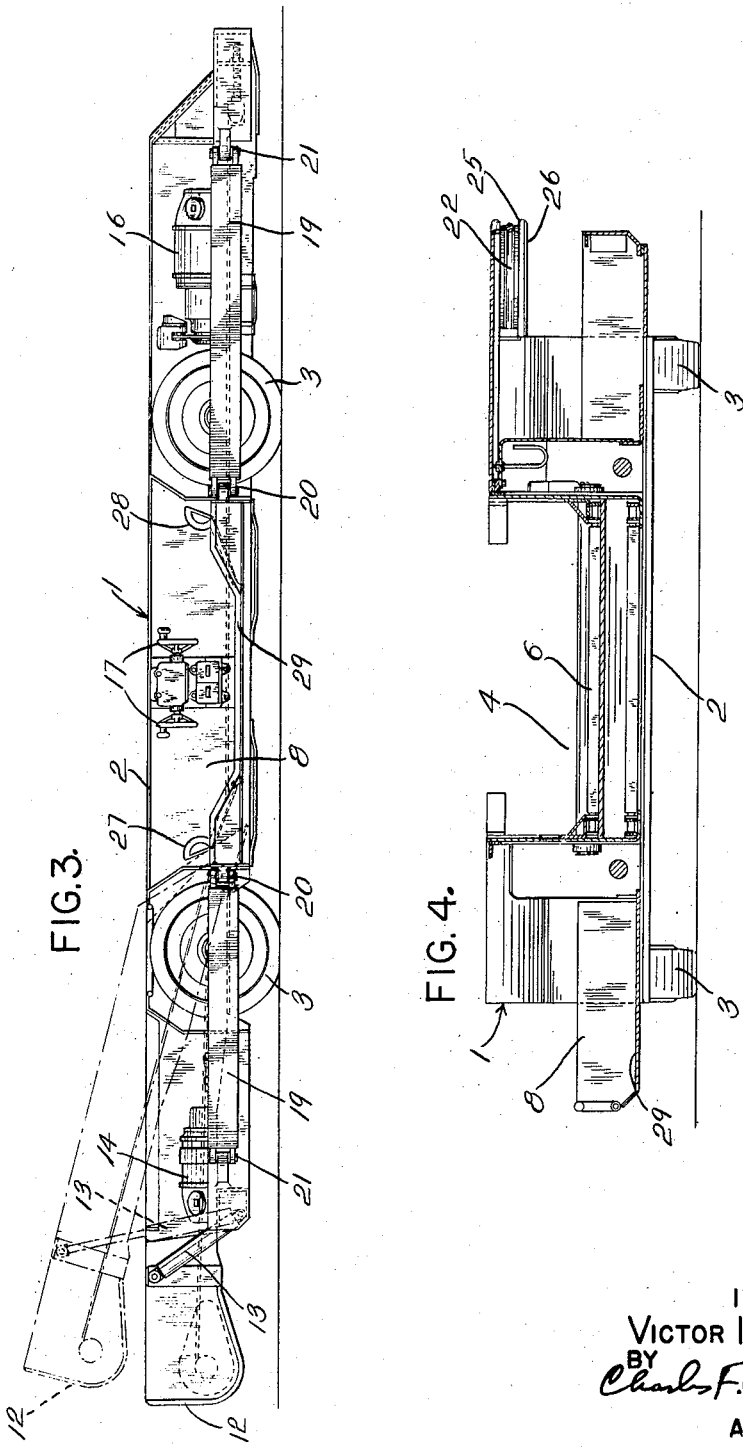

United States Patent Office 2,777,526
Patented Jan. 15, 1957

2,777,526

LOW HEIGHT MINE HAULAGE VEHICLE

Victor I. Dudley, Franklin, Pa., assignor to Joy Manufacturing Company, Pittsburgh, Pa., a corporation of Pennsylvania Original application October 27, 1950, Serial No. 192,571, now Patent No. 2,698,104, dated December 28, 1954. Divided and this application April 29, 1953, Serial No. 351,911

14 Claims. (Cl. 180—2)

This invention relates to mine haulage vehicles and particularly to a haulage vehicle of the type known as a shuttle-car for conveying loose material such as coal in underground mines wherein the headroom is extremely low.

Heretofore, shuttle cars were not adapted for use in mines having extremely low headroom due to their height and, moreover, due to their relatively short wheel bases with the ends of the cars overhanging the wheels substantial distances, the cars tended to rock endwise as they traveled over uneven floor surfaces frequently causing the ends of the car to bump the roof in an undesirable manner. Due to the conventional arrangement of the operator's station, the cable reeling mechanism and the driving motors at the ends of the car beyond the sides of the material receiving compartment, it was heretofore necessary to keep the wheel base relatively short and the ends of the car were necessarily wide. The present invention contemplates improvements over known types of shuttle cars in that a car is provided which is extremely low in height especially designed for use in mines having low headroom, and due to the novel arrangement of parts, the wheel base is made relatively long, reducing the overhang and without increasing the overall length of the car, thereby substantially reducing the undesirable rocking action and the resultant bumping of the roof which otherwise might occur frequently in mines having very low headroom. Due to the novel design, the operator's station and the cable reel mechanism are arranged amidships between the wheel axes at the opposite sides of the car body so that it is made possible to reduce the width of the end portions of the car thereby to facilitate maneuvering of the car through the relatively restricted spaces and sharply curved passageways encountered in underground mines. By increasing the wheel base a longer space has been provided for the operator's station without increasing the overall length of the car and this is desirable since the operator must assume a reclined position due to the low height of the mine headroom, and the operator's station is so arranged that the operator may readily control and observe the movements of the car while assuming a reclined position within his station on the car. A novel arrangement of controls is also provided whereby the car may be readily controlled during its operation in either direction and the reduced width of the ends of the car enables the operator to have a relatively clear view in advance of the car. The cable reeling mechanism for the power conductor cable has its guides arranged in a novel manner on the central portion of the car body and the reduced ends of the car body provide clearance for reducing the drag of the cable against the side of the body during travel of the vehicle in either direction. The improved shuttle car is not only low in height and relatively compact but is also rugged in construction, well adapted for its intended purpose.

An object of the present invention is to provide an improved mine haulage vehicle which, due to its novel design, is especially adapted for use in mines having low headroom. Another object is to provide an improved mine haulage vehicle of the type known as a shuttle car which due to its novel construction may readily negotiate the relatively restricted and sharply curved passageways of an underground mine. Yet another object is to provide an improved shuttle car having a novel arrangement of the operator's station and the cable reeling mechanism amidships of the car between the wheel axes whereby relatively narrow end portions for the car are made possible. Still another object is to provide an improved arrangement of the guides for the conductor cable at the wide central portion of the vehicle body whereby the reduced ends of the body provide clearance to reduce drag of the cable against the side of the body. A further object is to provide an improved shuttle car having a novel arrangement of the operator's station whereby the operator may assume a reclined position in a relatively comfortable manner in his station and wherein the narrow end portions of the car enable the operator to have a relatively clear view irrespective to the direction in which the vehicle is traveling. Yet another object is to provide an improved shuttle car having novel features of construction and arrangements of parts. These and other objects and advantages of the invention will, however, hereinafter more fully appear.

This application is a division of my copending application Serial No. 192,571, filed October 27, 1950, now matured into Patent No. 2,698,104, dated December 28, 1954.

In the accompanying drawings there is shown for purposes of illustration one form which the invention may assume in practice.

In these drawings:

Fig. 1 is a plan view of a shuttle car constructed in accordance with a preferred illustrative embodiment of the invention.

Fig. 2 is an end elevational view of the shuttle car shown in Fig. 1.

Fig. 3 is a side elevational view of the improved shuttle car.

Fig. 4 is an enlarged cross sectional view taken on line 4—4 of Fig. 1.

In this illustrative construction, as shown in the drawings, the improved mine haulage vehicle or so-called shuttle car is generally designated 1 and generally comprises a body 2 supported by steering and traction devices in the form of swivelly mounted propelling and steering wheels 3 of relatively small diameter and the car body has a material receiving compartment 4 provided with a hopperlike portion 5 at one end of the car. Extending longitudinally along the bottom of the compartment 4 is the top run of a conventional endless flight conveyor 6 driven by a motor 7. Arranged amidships of the car body at one side thereof between the wheels are spaces one providing an operator's station 8, and electrical equipment such as a cable reel mechanism 9 is suitably arranged in the other space at the opposite side of the body, this cable reel mechanism includes a cable reel 10 driven by a conventional hydraulic motor 11. The conveyor 6 has an adjustable discharge end 12 which may be adjusted by hydraulic jacks 13. A motor 14 drives liquid pumping means 15, and motors 16, 16 located at opposite sides of the car body beneath the sides of the hopperlike portion 5 drive the propelling and steering wheels 3.

The steering mechanism for the shuttle car may be similar to that disclosed in my Patent No. 2,590,300 granted March 25, 1952, and in order that steering of the car may be easily effected by the operator in either of his reclined positions in his station 8 on the vehicle during opposite directions of travel of the car, a pair of oppositely disposed coaxial hand wheels 17 is provided which serve to operate control valve means for the hydraulic operating cylinder of the steering gear, as fully disclosed in the copending application Serial No. 192,571 which has now matured into a patent as above referred to. These hand wheels, which are in effect operable controllable steering wheels, are suitably located substantially midway between the ends of the car body, centrally of the operator's station as shown, so that the hand wheels are at all times within convenient reach of the operator in either of his reclined positions in his station.

The vehicle has a relatively long wheel base and the material receiving compartment is arranged lengthwise of the body and extends longitudinally between the pairs of said wheels and the relatively narrow elongated spaces which respectively provides the operator's station 8 and receives the electrical equipment are at the sides of the vehicle body beyond the outer sides of the compartment intermediate the front and rear wheels. By the provision of the relatively long wheel base the overhang of the ends of the body longitudinally beyond the wheels is substantially reduced without reducing the overall length of the vehicle. The narrow end portions of the car body are designated 18 and are rigidly braced by relatively inclined bracing bars or struts 19 (Figs. 1 and 2) which are detachably connected at 20 to the wide central portion of the car body, and these bracing bars slant inwardly and longitudinally as shown in Fig. 1 with their outer ends detachably connected at 21 near the outer ends of the narrow body portions 18. With the arrangement shown, the car body is not only rigidly braced, but is also formed with tapering ends which facilitate movement of the car through the restricted and sharply curved passageways of the mine. The detachable connections 20 and 21 include removable pins which may be detached to permit lateral removal of the bracing bars 19 from the car body thereby to facilitate access to the sides of the body to permit repair and adjustment of the steering and propelling wheels, the wheel driving motors and the associated parts. The swivelled steering wheels 3 are arranged in spaces 20' having open outer sides obstructed by the bracing bars 19 with the wheel-spaces located inside of the bracing-bars beyond the ends of the straight sides of the wide central portion of the vehicle body as shown in Fig. 1. The wheel-receiving spaces 20' are located beyond the ends of the elongated spaces which respectively provide the operator's station 8 and receives the cable reel mechanism 9. The wheel-receiving spaces have at their inner sides transverse upright walls 21' which are located at the remote ends of the central side portion of the body. These upright walls extend only partially across the operator's station (Figs. 2 and 4) and in view of this and the relatively low positions of the bracing-bars 19 near the bottom of the vehicle body, the operator has a relatively clear view in advance of the vehicle. The narrow, tapering ends of the vehicle body enhance the operator's view especially during travel of the vehicle over rough terrain when the vehicle body tips up and down, irrespective of the direction in which the vehicle is traveling.

The cable reel 10 is arranged between a pair of side wheels in the space provided at the side of the machine opposite from the side at which the operator's station is located and the cable reel is arranged on a horizontal transverse axis. A power conductor cable 22 is adapted to conduct electrical energy to the several electric motors of the vehicle, herein desirably the motors 7, 14 and 16, and this conductor cable is wound on the reel 10 and extends longitudinally through a conventional automatic cable layer 23 and between a pair of horizontal pulleys 24 and 25 suitably journaled on upright axes within a horizontal frame portion 26 integral with the car body. The pulley 24 is relatively small in diameter and the cable extends longitudinally along one side of this pulley and beyond the discharge end of the car to a suitable point of connection with a main power conductor in a well known manner. The other large pulley 25 is arranged in the same horizontal planes as the pulley 24 and as the car turns or moves in the opposite direction, the cable extends about and is guided by this larger pulley. The conductor cable as it extends in the opposite direction i. e. toward the right in Fig. 1, is indicated in dotted lines. The pulleys 24 and 25 are located at the central wide portion of the car body, nearer to a point midway between the ends of the car than to the car-ends in such manner as to adequately guide the conductor cable during either direction of movement of the car. The tapering sides of the reduced end portions 18 of the car body provide clearance tending to reduce the scraping of the cable against the adjacent side of the car body as the car travels about the mine in either direction, thereby greatly reducing cable wear. Evidently, the space which receives the cable reeling mechanism 9 may receive other electric equipment such as control apparatus, and a battery, instead of the cable reeling mechanism, in a battery type car, may be employed.

Arranged in the space provided by the operator's station 8 are adjustable supports 27 and 28 mounted on a horizontal platform 29 arranged at the side of the car body below the bottom of the compartment 4 (Fig. 4), and these supports are located near the opposite ends of the operator's station and are oppositely disposed as shown in Fig. 3, so that one or the other may be effective to support the shoulders and back of the operator in either reclined position which he may assume in his station. These adjustable supports are fully disclosed in my copending application Serial No. 192,571. When the operator is in reclined position in his station with his back supported by an elevated back rest the other forwardly located back rest is collapsed so as not to obstruct the forward view of the operator, and the narrow tapering ends of the vehicle body are also arranged so as not to obstruct the operator's view in advance of the collapsed back rest.

As a result of this invention, an improved mine haulage vehicle or so-called shuttle car is provided which is extremely low in height especially designed for use in underground mines having relatively low head room and the vehicle due to its novel design substantially eliminates the usual endwise bouncing or rocking tendency such as is encountered in conventional shuttle cars, as it travels over an uneven floor surface, thereby avoiding frequent bumping of the mine roof so that the car may be efficiently operated under low headroom. The shuttle car is not only relatively low and compact but due to its novel shape, with relatively narrow tapering ends, it is possible readily to negotiate sharply curved and restricted passageways such as are encountered in an underground mine. By the provision of a car having a relatively long wheel base, much longer than that of a conventional shuttle car, it has been possible to locate the spaces for the operator's station and the electric equipment longitudinally at the sides of the relatively wide central portion of the car body amidships of the car and intermediate the front and rear wheels, and to substantially reduce overhang of the ends of the car beyond the wheels without decreasing the overall length of the car. The novel location of the guide sheaves for the conductor cable of the cable reeling mechanism at one side of the central portion of the car body permits the conductor cable to be adequately guided in opposite directions longitudinally of the car during the opposite directions of travel of the car and the novel shape of the car body with its tapering ends eliminates excessive scraping or dragging of the cable on the adjacent side of the car, resulting in decreased wear of the cable. The novel arrangement of the operator's station on the car body enables the operator to assume a relatively comfortable reclined position in his station during either direction of travel of the car while the tapering ends of the body afford the operator a relatively clear view in advance of the vehicle. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A reversible material haulage vehicle for use in underground mines having low headroom comprising a vehicle body of flat top low height construction, pairs of front and rear wheels for said body adapted to travel over a mine floor, the height of the vehicle being substantially determined by the height of said wheels, a material receiving compartment arranged lengthwise of said vehicle body and extending between said wheels, the vehicle having a relatively long wheel base in comparison to the overall length of the vehicle to provide elongated spaces at the sides of the body beyond the outer sides of said compartment intermediate the front and rear wheels, respectively for receiving auxiliary equipment and to provide a station for the operator, said wheels being so arranged with respect to the body that the wheel base is made relatively long as aforesaid, reducing the overhang of the ends of the body longitudinally beyond the wheels and without increasing the overall length of the vehicle, said body having a relatively wide central portion at the sides of which said elongated spaces are located, said overhanging ends of the body becoming relatively narrow as they extend towards the opposite ends of the vehicle whereby the latter may readily negotiate the sharply curved and restricted passageways of a mine irrespective of the direction in which the vehicle is traveling, said narrow ends of said body providing spaces at the inner sides thereof for receiving said wheels, the wheel receiving spaces having transverse upright walls at their adjacent ends with said walls located at the remote ends of said central wide portion of said body, said operator's station extending outwardly beyond the outer sides of the adjacent wheels.

2. A reversible material haulage vehicle for use in underground mines having low headroom comprising a vehicle body of flat top low height construction, pairs of swivelled front and rear steering wheels for said body adapted to travel over a mine floor, the height of the vehicle being substantially determined by the height of said wheels, a material receiving compartment arranged lengthwise of said vehicle body and extending between said wheels, the vehicle having a relatively long wheel base in comparison to the overall length of the vehicle and said wheels being so arranged with respect to the body that the wheel base is made relatively long as aforesaid, reducing substantial overhang of the ends of the body longitudinally beyond the wheels without increasing the overall length of the vehicle, said body having a relatively wide central portion and said overhanging ends of the body becoming relatively narrow as they extend from said wide central portion towards the opposite ends of the vehicle whereby the latter may readily negotiate the sharply curved and restricted passageways of a mine, said body at the sides of said narrow end portions of said body providing spaces for receiving said wheels, said wheel receiving spaces having transverse upright walls at their adjacent ends located at the remote ends of said central wide portion of said body with said wheel receiving spaces located forwardly and rearwardly of said central widened body portion, the sides of said narrow ends of said body being provided with removable braces extending between the wide middle portion of the body near the bottom of the latter and the narrow ends of said body, and detachable means for securing said braces in position on the vehicle body, said braces serving as guards at the sides of the vehicle and being removable at will to facilitate access to said wheel receiving spaces at the sides of the body and with said wheels normally located inside of and protected at their outer sides by said braces, said wheels having their outer sides located a substantial distance inwardly of the relatively wide central portion of the vehicle body whereby said wheels in all swivelled positions thereof are located within the lateral limits of the body.

3. A reversible material haulage vehicle for use in underground mines having low headroom and adapted to travel in either direction, the vehicle comprising a vehicle body of flat top low height construction, pairs of front and rear steering and driving wheels for said body adapted to travel over a mine floor, the height of the vehicle being substantially determined by the height of said wheels, a material receiving compartment arranged centrally lengthwise of said body and extending longitudinally between said wheels, said vehicle having a relatively long wheel base for a vehicle of a given length and said body providing relatively narrow elongated spaces at the sides of the vehicle body beyond the outer sides of said compartment intermediate said front and rear wheels, respectively to receive accessory equipment and to provide a station for the operator, said wheels being so arranged with respect to said body that the wheel base is made relatively long as aforesaid, reducing the overhang of the ends of said body longitudinally beyond said wheels, without increasing the overall length of the vehicle, said side space which provides the operator's station having at its bottom a longitudinal platform disposed horizontally below the compartment bottom and alongside said compartment between the steering and driving wheels, said platform extending horizontally outwardly beyond the outer sides of said wheels and being sufficiently long to accommodate an operator in a reclined position, said overhanging ends of said body becoming narrower as they extend longitudinally beyond the ends of said elongated side spaces with the remote ends of the vehicle substantially narrower than said central body portion midway between said front and rear wheels, said narrow ends of said body having spaces inwardly of the sides thereof for receiving said wheels, said wheel receiving spaces being located beyond the ends of said central wide portion of said body and spaced forwardly and rearwardly of said narrow elongated spaces.

4. A reversible material haulage vehicle as set forth in claim 3 wherein said operator's station is so arranged outwardly beyond the wheels and has its end walls so low and is so located at the side and below the top of the vehicle body at said relatively wide portion thereof that the forward narrow end of said body enables the operator to have a relatively clear view in advance of the vehicle irrespective of the direction of travel of the vehicle.

5. A reversible material haulage vehicle as set forth in claim 4 wherein the relatively narrow space which provides the operator's station at the side of said wide body portion is of sufficient length so that the operator may assume reversed reclined positions in his station and the arrangement of the operator's station and said oppositely narrowing ends of said body aiding in enabling the operator to have a relatively clear forward view irrespective to the direction in which the vehicle is traveling.

6. A reversible material haulage vehicle as set forth in claim 3 wherein said narrow overhanging ends of the vehicle body are tapered and diverge inwardly toward said wide central portion of said body whereby the vehicle may readily negotiate the sharply curved and relatively restricted passageways of a mine during either direction of travel of the vehicle, said wheel receiving spaces having transverse upright walls at their adjacent ends with said walls located at the opposite ends of said wide central portion of said body, the inclined sides of the tapering ends of said body intersecting the points of juncture of said walls with the sides of said wide central body portion.

7. A reversible material haulage vehicle as set forth in claim 1 wherein said space which receives auxiliary equipment contains a reel for a flexible power conductor element and guides for the conductor element are located at a side and near the top of said wide central body portion whereby the conductor element may be extended selectively around said guides longitudinally in opposite directions at points near the transverse center of the body with said points spaced substantial distances from the ends of the vehicle, and said narrow ends of said body providing clearance to reduce the drag of said conductor element against the side of the body during travel of the vehicle in either direction.

8. A reversible material haulage vehicle as set forth in claim 7 wherein said cable guides which are selectively engaged by said flexible power conductor element are located close to the juncture of a side of said central body portion and the adjacent side of a narrow end portion of the vehicle body.

9. In a reversible low height mine haulage vehicle adapted to travel in either direction, a body of flat top low height construction adapted for use in mines having low headroom, pairs of front and rear traction devices at the sides of said body for supporting, propelling and steering the vehicle, the height of the vehicle being substantially determined by the height of said traction devices, a material receiving compartment arranged centrally lengthwise of said vehicle body from end to end thereof and extending between said traction devices, said body having elongated spaces at the sides of a relatively wide central portion thereof within the lateral limits and below the top of the vehicle body at the outer sides of said compartment, said spaces extending longitudinally intermediate the front and rear traction devices and respectively providing a station for the operator and for receiving accessory equipment, the ends of said body overhanging said front and rear traction devices and said overhanging ends being relatively narrow and tapering towards the opposite ends of the vehicle to enable the latter readily to negotiate the sharply curved and restricted passageways of an underground mine, said narrow tapered ends having formed inside of their relatively inclined sides entirely within the lateral limits of the vehicle body and below the top of the vehicle, spaces for receiving said traction devices, said latter spaces being disposed beyond the ends of said elongated spaces entirely outside of said wide central portion of said body, said elongated space which provides the operator's station extending outwardly beyond the outer sides of the adjacent wheels whereby the operator may have a relatively clear view irrespective of the direction in which the vehicle is traveling.

10. A low height vehicle as set forth in claim 9 wherein the distance said front and rear traction devices are spaced apart longitudinally of said vehicle body is substantially greater than the distance between the ends of the vehicle and said traction devices thereby to provide spaces of substantial length longitudinally between said traction devices at each side of the vehicle, and the space which provides the operator's station being of sufficient length as to enable the operator to assume opposite reclined positions in his station to enable the operator to control and steer the vehicle during either direction of its travel.

11. A low height vehicle as set forth in claim 9 wherein said traction devices are in the form of swivelled steering and traction wheels and said spaces inside of said tapered end portions of said body being of substantial length and width so as to permit swivelling of said wheels while all portions of the latter are at all times confined within the lateral limits of said body.

12. In a low-height mine haulage vehicle, a mobile body having swivelled front and rear steering and traction wheels, said body providing side spaces for receiving said swivelled steering and traction wheels and a central portion of said body being widened between said side spaces, the height of the vehicle being substantially determined by the height of said steering and traction wheels, a material receiving compartment arranged centrally lengthwise of said body from end to end thereof and extending between said side spaces inwardly of the pairs of side wheels, the end of said body forwardly and rearwardly of said widened central portion being relatively narrow and tapering towards the opposite ends of the vehicle to enable the latter readily to negotiate the sharply curved and relatively restricted passageways of an underground mine, said wheel receiving spaces being arranged inwardly of the tapering sides of said narrow ends of said body forwardly and rearwardly of said central widened portion of said body, said tapering sides of said narrow ends of said body extending from the opposite ends of said widened central portion at the inner walls of said wheel receiving spaces to the opposite ends of the vehicle, said widened central poriton of said body providing a relatively long wheel base for said wheels with said narrow tapering ends of said body overhanging said front and rear wheels, said body having a space extending longitudinally at one side thereof at said widened central portion between said wheel receiving spaces to provide an operator's station of sufficient length as to enable the operator to assume a reclined position in the station whereby the operator may control and steer the vehicle when traveling in a mine having relatively low headroom, said operator's station extending outwardly beyond the outer sides of the adjacent wheels and having relatively low end walls.

13. A material haulage vehicle for use in underground mines having low headroom and adapted to travel over the mine floor, the vehicle comprising a vehicle body of flat top, low height construction, pairs of front and rear swivelled steering and driving wheels for said body, the height of the vehicle being substantially determined by the height of said wheels, said body providing a relatively narrow elongated space at one side of the vehicle intermediate the front and rear wheels at said side of the vehicle, said elongated space providing a station for the operator, said wheels being so arranged with respect to said body that the wheel base is made relatively long, reducing the overhang of the ends of said body longitudinally beyond said wheels without increasing the overall length of the vehicle, said overhanging ends of said body having spaces inwardly of the sides thereof for receiving said swivelled wheels with said wheels in all positions thereof disposed within the lateral limits of said body, said wheel-receiving spaces at said side of the vehicle being located beyond the ends of said elongated space which provides the operator's station, said elongated space providing the operator's station projecting laterally at said side of the vehicle outwardly beyond the outer sides of said wheels and having a relatively low end wall whereby the operator may have a relatively clear view in the direction in which the vehicle is traveling.

14. A material haulage vehicle as set forth in claim 13 wherein the vehicle is reversible and said elongated space is of such length as to accommodate the operator in reversed reclined positions in said station and said elongated space being so constructed with relatively low end walls at both ends to enable the operator to have a relatively clear view in either reversed position during either direction of travel of the vehicle.

(References on following page)

References Cited in the file of this patent

UNITED STATES PATENTS

| | | |
|---|---|---|
| 2,196,225 | Morrison | Apr. 9, 1940 |
| 2,226,027 | Stoner | Dec. 24, 1940 |
| 2,298,448 | Arentzen | Oct. 13, 1942 |
| 2,317,623 | Lee | Apr. 27, 1943 |
| 2,354,700 | Pezzano | Aug. 1, 1944 |
| 2,358,236 | Lee | Sept. 12, 1944 |
| 2,399,619 | Beck | May 7, 1946 |
| 2,488,520 | Beck | Nov. 22, 1949 |
| 2,494,324 | Wright | Jan. 10, 1950 |
| 2,591,584 | Moon | Apr. 1, 1952 |
| 2,698,104 | Dudley | Dec. 28, 1954 |